US011137264B2

(12) United States Patent
Ikeda et al.

(10) Patent No.: US 11,137,264 B2
(45) Date of Patent: Oct. 5, 2021

(54) DISPLAY SYSTEM, DISPLAY METHOD, AND STORAGE MEDIUM

(71) Applicant: HONDA MOTOR CO., LTD., Tokyo (JP)

(72) Inventors: Masaya Ikeda, Wako (JP); Kenji Sugiyama, Wako (JP); Yoshitaka Mimura, Wako (JP); Takashi Watanabe, Wako (JP); Taichi Sogo, Wako (JP); Masayuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/575,459

(22) Filed: Sep. 19, 2019

(65) Prior Publication Data
US 2020/0103248 A1    Apr. 2, 2020

(30) Foreign Application Priority Data

Sep. 27, 2018    (JP) .............................. JP2018-181659

(51) Int. Cl.
*G01C 21/36* (2006.01)
*B60K 35/00* (2006.01)

(52) U.S. Cl.
CPC .......... *G01C 21/3667* (2013.01); *B60K 35/00* (2013.01); *B60K 2370/166* (2019.05); *B60K 2370/177* (2019.05); *B60K 2370/188* (2019.05); *B60R 2300/804* (2013.01); *B60R 2300/8086* (2013.01)

(58) Field of Classification Search
CPC ............... G01C 21/3667; B60K 35/00; B60K 2370/177; B60K 2370/188; B60K 2370/166; B60R 2300/804; B60R 2300/8086
See application file for complete search history.

(56) References Cited

U.S. PATENT DOCUMENTS

| 7,127,350 B2 * | 10/2006 | Oikubo ............... G01C 21/3658 701/437 |
| 2010/0182140 A1 * | 7/2010 | Kohno ............... G01C 21/3697 340/438 |
| 2017/0067752 A1 * | 3/2017 | Wagner ............... G01C 21/3673 |
| 2017/0371334 A1 * | 12/2017 | Nagy .................... B60W 50/14 |

FOREIGN PATENT DOCUMENTS

WO    2017/104330    6/2017

* cited by examiner

*Primary Examiner* — James J Yang
(74) *Attorney, Agent, or Firm* — Amin, Turocy & Watson, LLP

(57) ABSTRACT

A display system includes: a display that displays an image; and a display controller that causes the display to display a first image resembling roads around a vehicle and a second image resembling a recommended lane determined on the basis of a route to a destination set by the vehicle among the roads around the vehicle. The display controller causes the display to display the second image and a third image guiding a course of the vehicle when the vehicle has reached a second position located a predetermined distance before a first position at which the vehicle has to make a turn in the route to the destination.

6 Claims, 11 Drawing Sheets

DISPLAY SYSTEM, DISPLAY METHOD, AND STORAGE MEDIUM

CROSS-REFERENCE TO RELATED APPLICATION

Priority is claimed on Japanese Patent Application No. 2018-181659, filed Sep. 27, 2018, the content of which is incorporated herein by reference.

BACKGROUND

Field of the Invention

The present invention relates to a display system, a display method, and a storage medium.

Description of Related Art

Conventionally, a technology of displaying a turn-by-turn image on a navigation screen until a vehicle passes through a branching point when the distance to a branching point (for example, an intersection) at which the vehicle has to make a turn is equal to or smaller than a predetermined distance in a display system that displays route guidance to a destination is known (for example, International Patent Publication No. 2017/104330). In this technology, a mark indicating a present position, an arrow indicating an advancing direction, and a memory indicating the distance to a branching point are displayed on a map image from a present position to a branching point as a turn-by-turn image.

SUMMARY

However, in the conventional technology, it was difficult to understand at which timing a driver had to change route before reaching a branching point after a turn-by-turn image was displayed and it was difficult to understand at which branching point a driver had to make a turn when there was another branching point near the branching point at which the driver had to make a turn.

In view of the above-described problems, one of objects of an aspect of the present invention is to provide a display system, a display method, and a storage medium capable of providing route guidance in such a manner as to be easily understood by an occupant.

The display system, the display method, and the storage medium according to this invention employ the following configuration.

(1) A display system according to an aspect of the present invention is a display system including: a display that displays an image; and a display controller that causes the display to display a first image resembling roads around a vehicle and a second image resembling a recommended lane determined on the basis of a route to a destination set by the vehicle among the roads around the vehicle, wherein the display controller causes the display to display the second image and a third image guiding a course of the vehicle when the vehicle has reached a second position located a predetermined distance before a first position at which the vehicle has to make a turn in the route to the destination.

(2) In the aspect of (1), the display controller causes the display to display the second image in synchronization with the start and end of displaying the third image.

(3) In the aspect of (1), the display controller causes the display to display the second image so as to be superimposed on a lane after making a turn when the vehicle has reached a third position located closer to the first position than to the second position.

(4) In the aspect of (3), when there are a plurality of lanes after making a turn, the display controller causes the display to display the second image so as to be superimposed on the plurality of lanes after making a turn.

(5) In the aspect of (1), the display controller causes the display to display an image related to a travel mode of the vehicle on the display and displays the second image on the display in a color correlated with a color of the image related to the travel mode.

(6) A display method according to an aspect of the present invention is a display method for causing a computer mounted in a vehicle including a display that displays an image to execute: displaying a first image resembling roads around a vehicle and a second image resembling a recommended lane determined on the basis of a route to a destination set by the vehicle among the roads around the vehicle on the display; and displaying the second image and a third image guiding a course of the vehicle on the display when the vehicle has reached a second position located a predetermined distance before a first position at which the vehicle has to make a turn in the route to the destination.

(7) A storage medium according to an aspect of the present invention is a computer-readable non-transitory storage medium storing a program for causing a computer mounted in a vehicle including a display that displays an image to execute: displaying a first image resembling roads around a vehicle and a second image resembling a recommended lane determined on the basis of a route to a destination set by the vehicle among the roads around the vehicle on the display; and displaying the second image and a third image guiding a course of the vehicle on the display when the vehicle has reached a second position located a predetermined distance before a first position at which the vehicle has to make a turn in the route to the destination.

According to (1) to (7), it is possible to provide route guidance in such a manner as to be easily understood by an occupant.

DESCRIPTION OF EMBODIMENTS

Hereinafter, an embodiment of a display system, a display method, and a storage medium according to the present invention will be described with reference to the drawings. In the embodiment, a display system that displays a recognition result of the surroundings of a vehicle in which driving control that supports a driving operation of an occupant is performed on a display device mounted in the vehicle will be described. The driving control means controls steering or a speed of a vehicle or both, for example. Driving control such as adaptive cruise control system (ACC), a lane keeping assistance system (LKAS), auto lane changing (ALC), or lane change assist (LCA) can be executed as the driving control. ACC is driving control for allowing a vehicle to travel by following a preceding vehicle, for example. LKAS is driving control for a vehicle to keep a traveling lane, for example. ALC is driving control of changing lanes on the basis of a route set by a navigation apparatus regardless of whether a lane changing instruction is received from an occupant, for example. ALC includes lane changing in automated passing control and lane changing at branching points, for example. LCA is driving control in which a traveling lane is changed in an indicated direction on the basis of a lane changing instruction from an occupant.

[Overall Configuration]

Figure 1:
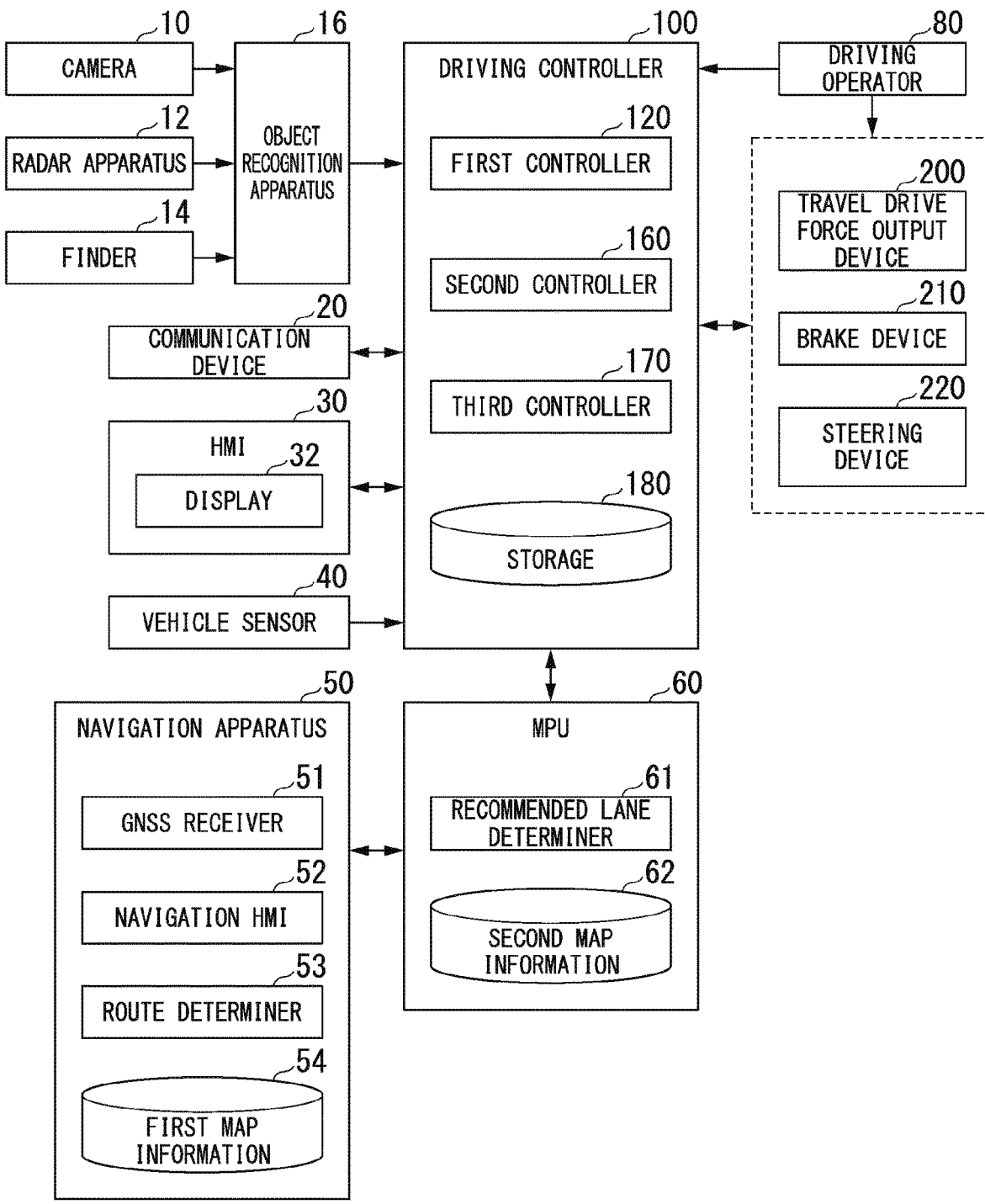
FIG. 1 is a diagram of a vehicle system including a display system according to an embodiment.

FIG. 1 is a diagram of a vehicle system 1 including a display system according to the embodiment. A vehicle (hereinafter referred to as a host vehicle M) in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or electric power discharged by secondary batteries or fuel-cell batteries.

The vehicle system 1 includes, for example, a camera 10, a radar apparatus 12, a finder 14, an object recognition apparatus 16, a communication device 20, a human machine interface (HMI) 30, a vehicle sensor 40, a navigation apparatus 50, a map positioning unit (MPU) 60, a driving operator 80, a driving controller 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, and some of these components may be omitted and other components may be added. A combination of the HMI 30 and a third controller to be described later is an example of a "display system".

The camera 10 is, for example, a digital camera which uses a solid-state imaging device such as a charge coupled device (CCD) or a complementary metal oxide semiconductor (CMOS). The camera 10 is attached to an arbitrary position on a host vehicle M. When capturing images on the side in front, the camera 10 is attached to an upper part of a front windshield or a back surface of a rear-view mirror. The camera 10, for example, captures the images around the host vehicle M repeatedly and periodically. The camera 10 may be a stereo camera.

The radar apparatus 12 emits radio waves such as millimeter waves to the surroundings of the host vehicle M and detects radio waves (reflected waves) reflected from an object to detect at least the position (the distance and direction) of the object. The radar apparatus 12 is attached to an arbitrary position on the host vehicle M. The radar apparatus 12 may detect the position and the speed of an object according to a frequency modulated continuous wave (FM-CW) method.

The finder 14 is a light detection and ranging or laser imaging detection and ranging (LIDAR) device. The finder 14 radiates light to the vicinity of the host vehicle M and measures scattering light. The finder 14 detects the distance to an object on the basis of the time taken to receive light after the light was emitted. The radiated light is pulsating laser light, for example. The finder 14 is attached to an arbitrary position on the host vehicle M.

The object recognition apparatus 16 performs sensor fusion processing on detection results obtained by some or all of the camera 10, the radar apparatus 12, and the finder 14 to recognize the position, the kind, the speed, and the like of an object. The object recognition apparatus 16 outputs the recognition results to the driving controller 100. The object recognition apparatus 16 may output the detection results obtained by the camera 10, the radar apparatus 12, and the finder 14 to the driving controller 100 as they are. The object recognition apparatus 16 may be omitted from the vehicle system 1.

The communication device 20, for example, communicates (vehicle-to-vehicle communication) with other vehicles present around the host vehicle M using a cellular network, a Wi-Fi network, Bluetooth (registered trademark), a dedicated short range communication (DSRC), or the like, or communicates with various servers via a wireless base station.

The HMI 30 presents various pieces of information to an occupant of the host vehicle M and receives input operations of the occupant. The HMI 30 includes a display 32, switches, speakers, buzzers, touch panels, keys, and the like, for example. The display 32 includes a first display 32A and a second display 32B, for example.

Figure 2:
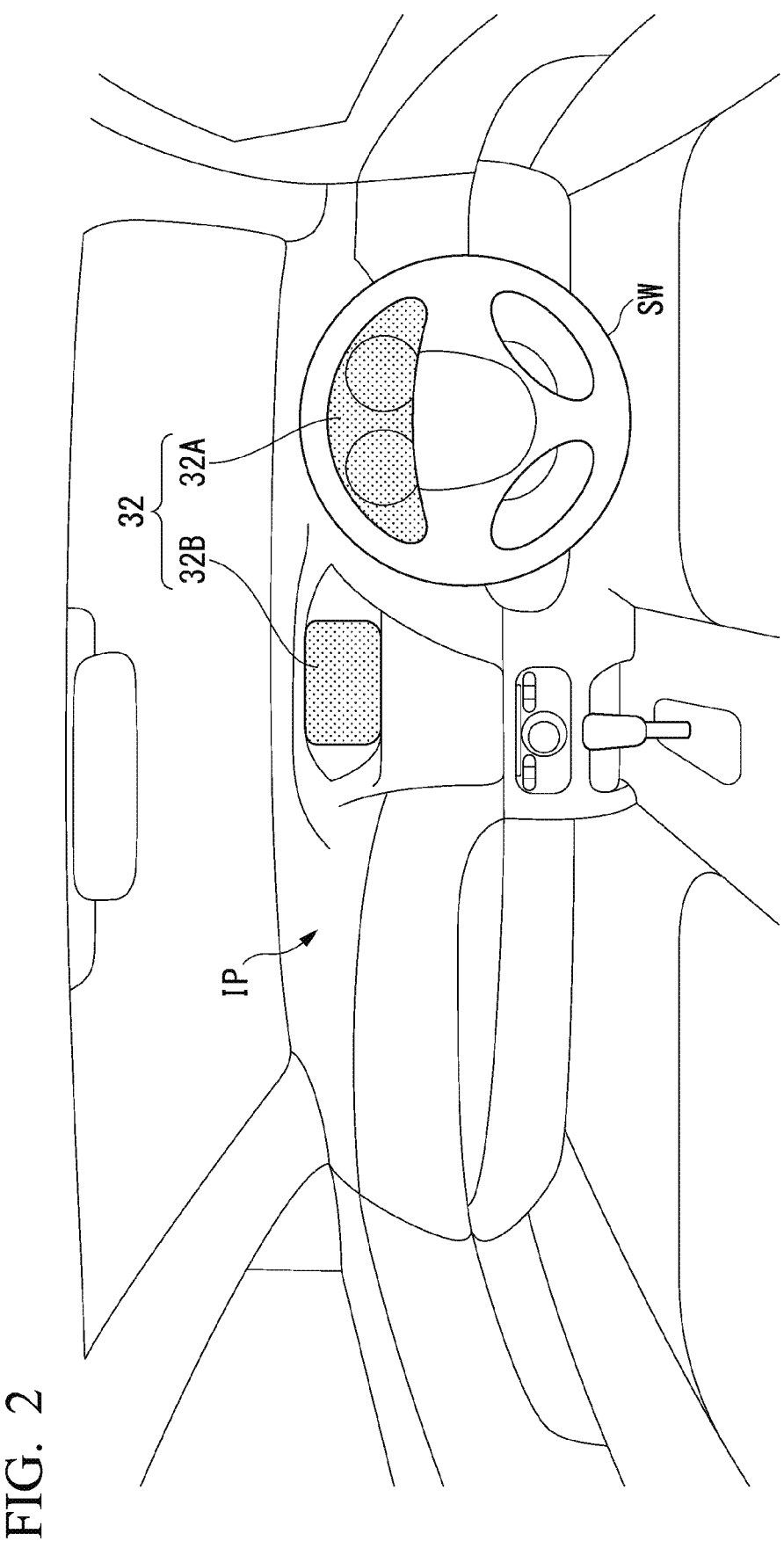
FIG. 2 is a diagram schematically illustrating the state of a cabin of a host vehicle M.

FIG. 2 is a diagram schematically illustrating the state of a cabin of the host vehicle M. For example, the first display 32A is provided near a surface of an instrument panel IP in front of a driver's seat (for example, a seat closest to a steering wheel SW) and is provided at such a position that an occupant can see the first display 32A through a vacant space in the steering wheel SW or over the steering wheel SW. The first display 32A is, for example, a liquid crystal display (LCD) or an organic electroluminescence (EL) display. Information necessary for traveling during manual driving or driving control of the host vehicle M is displayed on the first display 32A as an image. Examples of the information necessary for traveling of the host vehicle M during manual driving include the speed, an engine rotation speed, a remaining fuel amount, a radiator temperature, a mileage, and other information. Examples of the information necessary for traveling of the host vehicle M during driving control include, for example, information on a lane (a lane mark), a route (a recommended lane) to a destination recommended by a system such as the navigation apparatus 50, a future trajectory (a target trajectory) of the host vehicle M, and other vehicles. The information necessary for traveling of the host vehicle M during driving control may include part or all of the pieces of information necessary for traveling of the host vehicle M during manual driving.

The second display 32B is provided near the center of the instrument panel, for example. The second display 32B is, for example, an LCD or an organic EL display similarly to the first display 32A. The second display 32B displays an image corresponding to a navigation process executed by the navigation apparatus 50, for example. The second display 32B may display TV programs, play a DVD, and display contents such as a downloaded movie. The display 32 may include a head-up display (HUD) device instead of (or in addition to) the first display 32A and the second display 32B. The HUD device is a device that displays an image to be visible in a state of being superimposed on an exterior scene, and as an example, is a device that allows an image to be visible to a viewer by projecting light including an image on a front windshield or a combiner of the host vehicle M. A viewer is a driver, for example, and may be an occupant other than the driver.

The vehicle sensor 40 includes a vehicle speed sensor that detects the speed of the host vehicle M, an acceleration sensor that detects an acceleration, a yaw-rate sensor that detects an angular speed about a vertical axis, an azimuth sensor that detects the direction of the host vehicle M, and the like.

The navigation apparatus 50 includes, for example, a global navigation satellite system (GNSS) receiver 51, a navigation HMI 52, and a route determiner 53. The navigation apparatus 50 stores first map information 54 in a storage device such as a hard disk drive (HDD) or a flash memory.

The GNSS receiver 51 specifies the position of the host vehicle M on the basis of signals received from GNSS satellites. The position of the host vehicle M may be specified or complemented by an inertial navigation system (INS) which uses the output of the vehicle sensor 40.

The navigation HMI 52 includes a display device, a speaker, a touch panel, keys, and the like. The navigation HMI 52 may be partially or entirely shared with the HMI 30.

For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like. The map route is output to the MPU 60.

Moreover, the navigation apparatus 50, for example, may perform route guidance using the navigation HMI 52 on the basis of the map route. The navigation apparatus 50 may be realized by the functions of a terminal device such as a smartphone or a tablet terminal held by an occupant. The navigation apparatus 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 divides the map route provided from the navigation apparatus 50 into a plurality of blocks (for example, the route may be partitioned every 100 [m] in relation to a vehicle traveling direction) and determines a recommended lane for each block by referring to the second map information 62. The recommended lane determiner 61 determines that the host vehicle is traveling in a certain lane from the left. When a branching point is present on a map route, the recommended lane determiner 61 determines a recommended lane so that the host vehicle M can travel along a reasonable route for proceeding to a branch destination.

The second map information 62 is map information with higher accuracy than the first map information 54. The second map information 62 includes, for example, information on the center of a lane or information on the boundaries of a lane, and information on the type of a lane. The second map information 62 may include road information, traffic regulation information, address information (address and postal codes), facility information, telephone number information, and the like. The second map information 62 may be updated as necessary by the communication device 20 communicating with other devices.

The driving operator 80 includes, for example, a steering wheel SW, an acceleration pedal, a brake pedal, a shift lever, a deformed steering wheel, a joystick, and other operators. Sensors that detect an amount of an operation or the presence of an operation are attached to the driving operator 80, and the detection results are output to any one or both of the driving controller 100 or the travel drive force output device 200, the brake device 210, and the steering device 220.

The driving controller 100 includes, for example, a first controller 120, a second controller 160, a third controller 170, and a storage 180. The first controller 120, the second controller 160, and the third controller 170 are realized when a computer processor such as a central processing unit (CPU) or the like executes a program (software). Moreover, some or all of these components may be realized by hardware (a circuit portion; including circuitry) such as a large scale integration (LSI), an application specific integrated circuit (ASIC), a field-programmable gate array (FPGA), or a graphics processing unit (GPU) and may be realized by the cooperation of software and hardware. The program may be stored in advance in the storage 180 of the driving controller 100 and may be stored in a removable storage medium (a non-transitory storage medium) such as a DVD or a CD-ROM and be installed on the storage 180 when the storage medium is attached to a drive device.

The storage 180 is realized, for example, by a HDD, a flash memory, an electrically erasable programmable read only memory (EEPROM), a read only memory (ROM), or a random access memory (RAM). The storage 180 stores programs and the like read and executed by a processor, for example.

Figure 3:
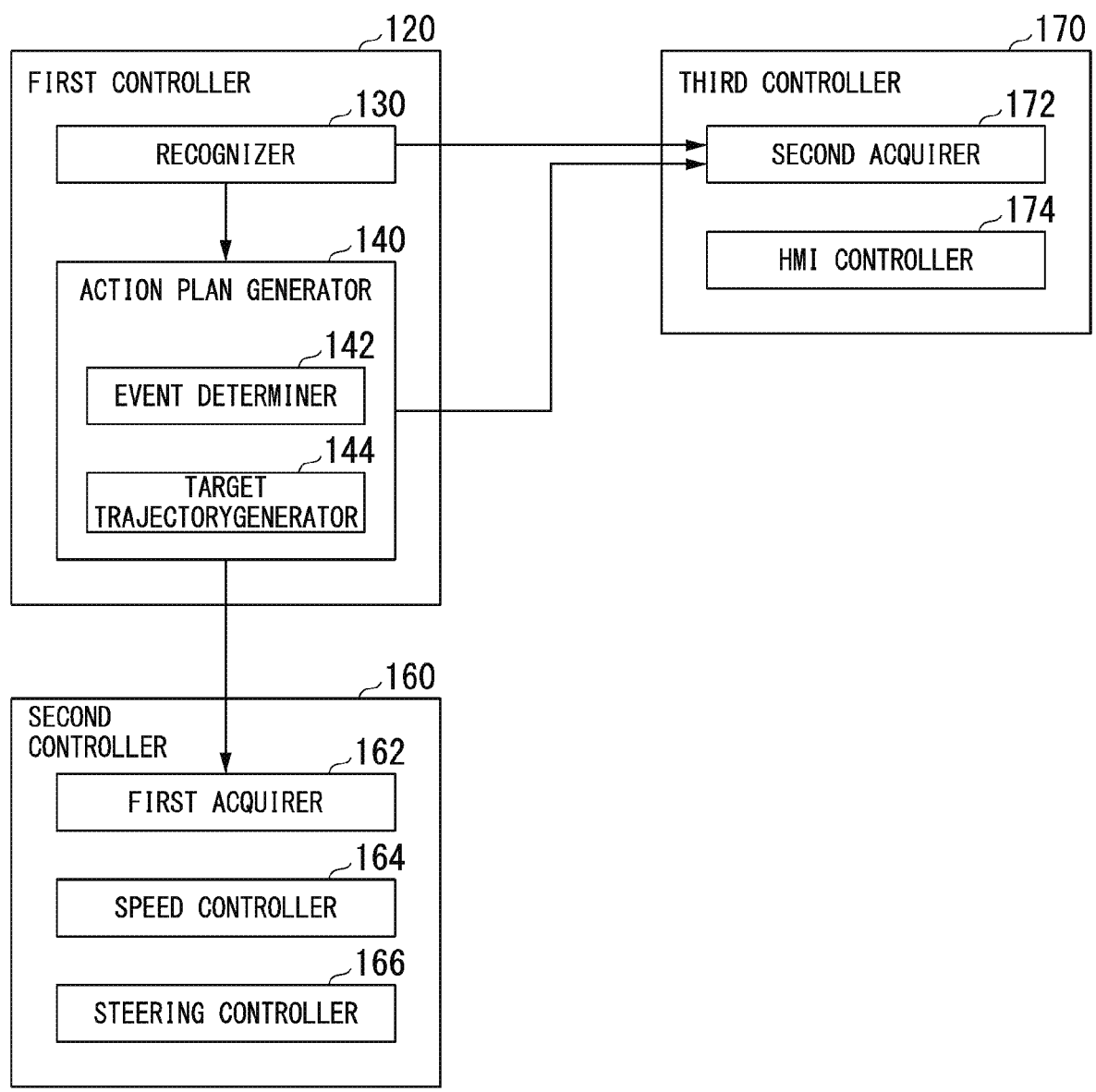
FIG. 3 is a diagram illustrating a functional configuration of a first controller, a second controller, and a third controller.

FIG. 3 is a diagram illustrating a functional configuration of the first controller 120, the second controller 160, and the third controller 170. For example, the first controller 120 includes a recognizer 130 and an action plan generator 140. For example, the first controller 120 realizes the functions of artificial intelligence (AI) and the functions of a predetermined model in parallel. For example, a function of "recognizing an intersection" may be realized by executing recognition of an intersection by deep learning and recognition based on a predetermined condition (signals, road marks, and the like which can be subjected to pattern matching) in parallel and scoring both recognition results to make a comprehensive evaluation. In this way, the reliability of driving control of the host vehicle M is secured.

The recognizer 130 recognizes a surrounding state of the host vehicle M. For example, the recognizer 130 recognizes objects present around the host vehicle M on the basis of the information input from the camera 10, the radar apparatus 12, and the finder 14 via the object recognition apparatus 16. The objects recognized by the recognizer 130 are other vehicles such as, for example, a bicycle, a motorcycle, and a four-wheeled automobile. The object includes a pedestrian, a road sign, a road mark, a lane mark, a post, a guard rail, and a fallen object. The recognizer 130 recognizes the state of the host vehicle M such as a position of an object, a speed, an acceleration, a steering angle, and a direction of the host vehicle M. The object position is recognized as the position (that is, a relative position in relation to the host vehicle M) on a relative coordinate system in which a representative point (the center of gravity, the center of a driving shaft, or the like) of the host vehicle M is at the origin, for example, and is used for control. The object position may be represented by a representative point such as the center of gravity or a corner of the object and may be represented by a region. The "state" of an object may include an acceleration or a jerk of an object or an "action state" (for example, whether the object has changed or is trying to change lanes) when the object is a moving object such as another vehicle.

For example, the recognizer 130 recognizes a road shape around the host vehicle M. For example, the recognizer 130 recognizes a host lane in which the host vehicle M is traveling and adjacent lanes adjacent to the host lane. For example, the recognizer 130 recognizes the host lane and the adjacent lanes by comparing a pattern (for example, an arrangement of solid lines and broken lines) of road lane marks obtained from the second map information 62 and a pattern of road lane marks around the host vehicle M recognized from the images captured by the camera 10.

The recognizer 130 may recognize the host lane and the adjacent lanes by recognizing runway boundaries (road boundaries) including road lane marks, road shoulders, curbs, a median strip, guard rails, and the like without being limited to the road lane marks. In this recognition, the position of the host vehicle M acquired from the navigation apparatus 50 and the processing results of the INS may be also taken into consideration. The recognizer 130 recognizes a temporary stop line, an obstacle, a red sign, a toll booth, and other road events.

When recognizing the host lane, the recognizer 130 recognizes a relative position and a direction of the host vehicle M in relation to the host lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the host lane. Instead of this, the recognizer 130 may recognize the position or the like of the reference point of the host vehicle M in relation to any one of side ends (road lane marks or road boundaries) of the host lane as the relative position of the host vehicle M in relation to the host lane.

The action plan generator 140 includes an event determiner 142 and a target trajectory generator 144, for example. The event determiner 142 determines an event of driving control in a route in which a recommended lane is determined. The event is information defining a travel mode of the host vehicle M.

Examples of the event include a constant speed travel event in which the host vehicle M travels in the same lane at a constant speed, a trailing travel event in which the host vehicle M follows another vehicle (hereinafter referred to a preceding vehicle as necessary) positioned within a predetermined distance (for example, 100 [m]) in front of the host vehicle M and closest to the host vehicle M, a lane changing event in which the host vehicle M changes lanes from the host lane to an adjacent lane, a passing event in which the host vehicle M changes lane to an adjacent lane temporarily, passes a preceding vehicle in the adjacent lane, and then, changes lane to the original lane again, a diverging event in which the host vehicle M branches to a destination-side lane at a branching point of a road, and a merging event in which the host vehicle M merges into a main lane at a junction point. The "trailing" may be a travel mode in which an inter-vehicle distance (a relative distance) between the host vehicle M and a preceding vehicle is maintained to be constant and may be a travel mode in which the host vehicle M travels along the center of a host lane in addition to maintaining a constant inter-vehicle distance between the host vehicle M and a preceding vehicle. For example, the events may include a takeover event for ending automated driving based on driving control and switching to manual driving and an avoidance event of causing the host vehicle M to perform either a braking operation or a steering operation in order to avoid an obstacle present in front of the host vehicle M.

The event determiner 142 may change an event determined in advance for a present segment to another event and determine a new event for the present segment depending on a surrounding situation recognized by the recognizer 130 during traveling of the host vehicle M, for example.

The event determiner 142 may change an event determined in advance for a present segment to another event and determine a new event for the present segment according to an operation of an occupant on an in-vehicle device. For example, the event determiner 142 may change an event determined in advance for a present segment to a lane changing event and determine a new lane changing event for the present segment when a winker switch or the like is operated by an occupant.

In principle, the target trajectory generator 144 generates a future target trajectory for allowing the host vehicle M to travel automatically (regardless of an operation of a driver) in a travel mode defined by an event in order to cope with a surrounding situation when the host vehicle M travels in the recommended lane determined by the recommended lane determiner 61 and the host vehicle M travels in the recommended lane. The target trajectory includes a position element that defines the position of the host vehicle M in the future and a speed element that defines the speed or the like of the host vehicle M in the future, for example.

For example, the target trajectory generator 144 determines a plurality of positions (trajectory points) that the host vehicle M has to reach sequentially as the position elements of the target trajectory. The trajectory points are positions that the host vehicle M has to reach every predetermined travel distance (for example, approximately every several

[m]). The predetermined travel distance may be calculated as the distance along a road when a vehicle proceeds along a route, for example.

The target trajectory generator 144 determines a target speed and a target acceleration every predetermined sampling period (for example, approximately every 0.x [sec]) as the speed element of the target trajectory. The trajectory points may be the positions that the host vehicle M has to reach at respective sampling time points of the predetermined sampling periods. In this case, the target speed and the target acceleration are determined by the intervals of the sampling periods and the trajectory points. The target trajectory generator 144 outputs information indicating the generated target trajectory to the second controller 160.

The second controller 160 controls the travel drive force output device 200, the brake device 210, and the steering device 220 so that the host vehicle M pass along the target trajectory generated by the target trajectory generator 144 at a scheduled time.

The second controller 160 includes, for example, a first acquirer 162, a speed controller 164, and a steering controller 166. The first acquirer 162 acquires information on the target trajectory (trajectory points) from the target trajectory generator 144 and stores the information in the memory of the storage 180.

The speed controller 164 controls one or both of the travel drive force output device 200 and the brake device 210 on the basis of the speed element (for example, the target speed, the target acceleration, and the like) included in the target trajectory stored in the memory.

The steering controller 166 controls the steering device 220 according to the position element (for example, a curvature indicating the degree of curving of a target trajectory) included in the target trajectory stored in the memory. Driving control in the embodiment means controlling one or both of the travel drive force output device 200 and the brake device 210 and the steering device 220, for example.

The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination.

The travel drive force output device 200 outputs a travel drive force (torque) for a vehicle to travel to driving wheels. The travel drive force output device 200 includes a combination of an internal combustion engine, an electric motor, and a transmission and a power electronic controller (ECU) that controls these components. The power ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor. The electric motor, for example, applies a force to a rack-and-pinion mechanism to change the direction of a steering wheel. The steering ECU drives an electric motor according to the information input from the second controller 160 or the information input from the driving operator 80 to change the direction of the steering wheel.

The third controller 170 includes a second acquirer 172 and a HMI controller 174, for example. The HMI controller 174 is an example of a "display controller".

The second acquirer 172 acquires information on the recognition result obtained by the recognizer 130. The second acquirer 172 acquires information on the target trajectory generated by the target trajectory generator 144. The second acquirer 172 acquires map information around the host vehicle M and map information to a destination from the navigation apparatus 50 or the MPU 60. The second acquirer 172 acquires information on the recommended lane determined by the recommended lane determiner 61.

The HMI controller 174 causes the HMI 30 to output various pieces of information on the basis of the information acquired by the second acquirer 172. For example, the HMI controller 174 generates an image corresponding to the information acquired by the second acquirer 172 and causes the displays 32 to display the generated image. For example, the HMI controller 174 causes to display the generated image on one or both of the first display 32A and the second display 32B designated by an occupant. The HMI controller 174 may cause to display the generated image on a display correlated with a travel mode (for example, an event of driving control) of the host vehicle M.

[Process of HMI Controller in Each Scene]

Figure 4:
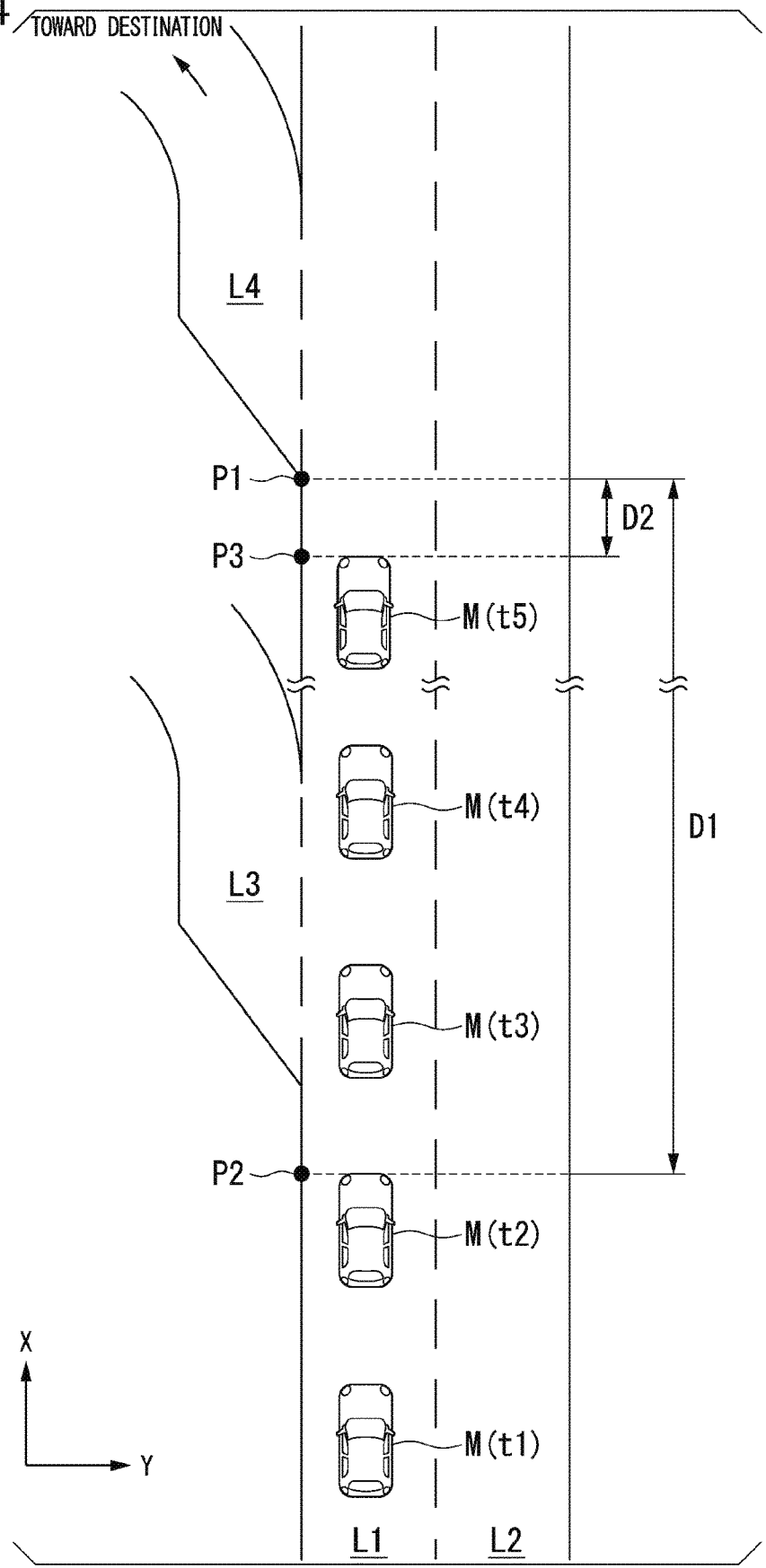
FIG. 4 is a diagram illustrating an example of a surrounding state of a host vehicle M for describing respective scenes.

Hereinafter, the process of the HMI controller 174 in respective scenes in which the host vehicle M travels will be described. In the following description, an example in which the host vehicle M makes a turn by a driving operation (manual driving) of an occupant will be mainly described. FIG. 4 is a diagram illustrating an example of a surrounding state of the host vehicle M for describing respective scenes. In the example of FIG. 4, it is assumed that the host vehicle M travels in a lane L1 among lanes L1 and L2 extending in the X-direction in FIG. 4, and branching lanes L3 and L4 are present in the lane L1. In the following example, it is assumed that it is necessary to make a turn from the lane L1 to the lane L4 in order to proceed toward a destination set by the navigation apparatus 50. In the following description, it is assumed that the host vehicle M reaching the position P is equivalent to reaching a line extended from each of positions P1 to P3 illustrated in FIG. 4 in a vehicle width direction (the Y-direction in FIG. 4) of the lanes L1 and L2.

In the following description, it is assumed that time points t1 to t5 satisfy a relation of "t1<t2<t3<t4<t5" and the position of a vehicle at the respective time points are referred to as host vehicles M (T). In the following description, it is assumed that an image generated by the HMI controller 174 is displayed on the first display 32A. Although a tachometer indicating a rotation speed of an engine, a speedometer indicating the speed of the host vehicle M, and the like are also included in the image displayed on the first display 32A, the description of these meters will be omitted. The type of the images generated by the HMI controller 174 and the layout such as an arrangement are not limited to the images described below.

<First Scene (Time Point t1)>

Figure 5:
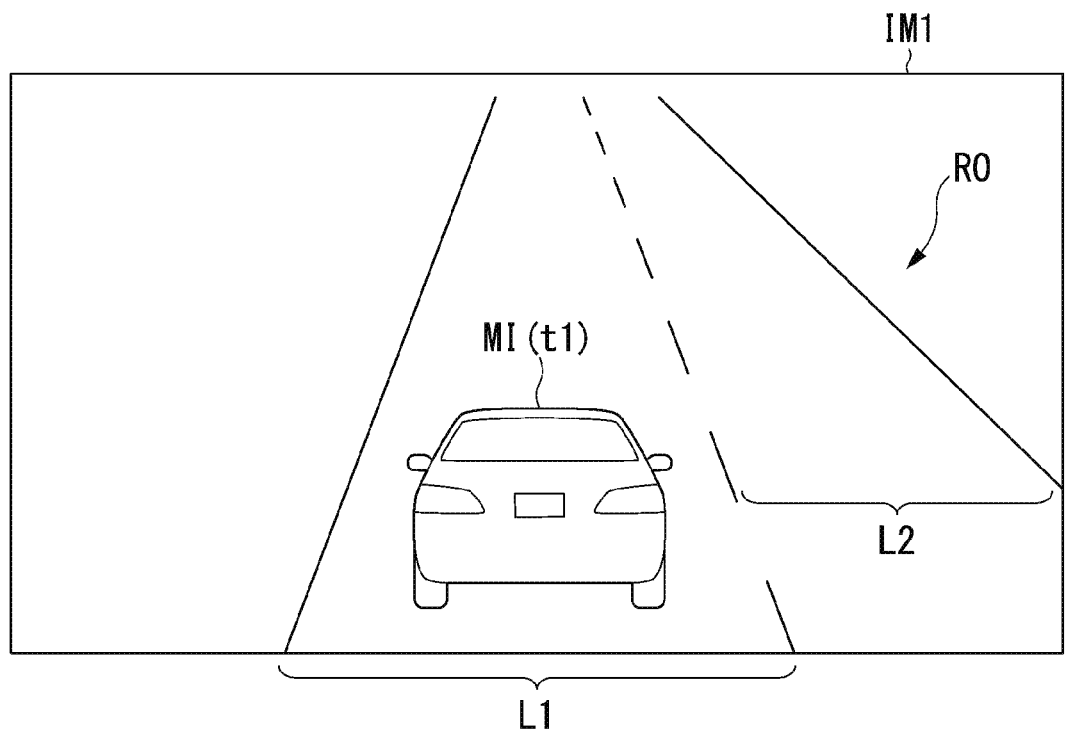
FIG. 5 is a diagram illustrating an example of a host vehicle surrounding image generated by a HMI controller in a first scene.

A first scene (time point t1) is a scene in which the host vehicle M travels in the lane L1. FIG. 5 is a diagram illustrating an example of a host vehicle surrounding image IM1 generated by the HMI controller 174 in the first scene. It is assumed that the image IM1 has a size corresponding to the size of an image display region of the first display 32A. The same is applied to the respective images IM to be described later.

In this scene, the HMI controller 174 generates a road image (an example of a first image) RO resembling a road around the host vehicle M recognized by the recognizer 130. The road image RO includes images resembling the lanes L1 and L2, for example. In the example of FIG. 5, a road image RO is illustrated in which the lane L1 in which the host vehicle M travels is positioned near the center (for example, the center in the width direction) of the host vehicle surrounding image IM1. The HMI controller 174 may display a lane mark between lanes where lane changing is allowed and a lane mark between lanes where lane changing is not allowed in different display modes (for example, a solid line and a dot line). Whether lane changing is allowed or not can be acquired by referring to map information (the first map information 54 and the second map information 62), for example. In the example of FIG. 5, a lane mark (dot line) where lane changing is allowed is illustrated between the lanes L1 and L2 in the host vehicle surrounding image IM1.

The HMI controller 174 may generate an image (hereinafter referred to as a host vehicle image MI(t1)) resembling the host vehicle M and may display the generated host vehicle image MI(t1) so as to be superimposed on a presence position on the road image RO. In this case, the HMI controller 174 may adjust the size of the host vehicle image MI(t1) so as to correspond to the size of a lane in the road image RO. The HMI controller 174 may generate an image (hereinafter referred to as other vehicle image mI) resembling the other vehicle m recognized by the recognizer 130 and may display the generated other vehicle image mI so as to be superimposed on a presence position on the road image RO. In this case, the HMI controller 174 may use different colors, designs, shapes, or the like so that an occupant can visually distinguish the host vehicle image MI(t1) and the other vehicle image mI.

<Second Scene (Time Point t2)>

A second scene (time point t2) illustrates a scene in which the host vehicle M has reached a second position P2 located a predetermined distance D1 before a first position P1 at which the host vehicle M has to make a turn on a route to a destination. The position P1 is a position at which the host vehicle M has to change lanes in order to proceed toward a destination, for example. The position at which the host vehicle M has to change lanes is a starting position of branching between the lanes L1 and L4 or a position near the starting position, for example. The position at which the host vehicle M has to change lanes may be a position at which a steering operation of an occupant for changing lanes starts and may be a position at which LCA-based driving control is executed. The predetermined distance D1 is a fixed distance determined in advance and may be a variable distance set on the basis of a road shape (for example, the number of lanes, a vehicle width, a road curvature), the speed of the host vehicle M, and the like. In the following description, it is assumed that the lanes L1 and L2 are lanes on an expressway and the predetermined distance D1 is 2 [km].

In the second scene, the HMI controller 174 generates a recommended lane image (an example of a second image) resembling a recommended lane acquired by the second acquirer 172 when the host vehicle M reaches the second position P2. The HMI controller 174 generates a turn-by-turn image (an example of a third image) related to a guidance figure that guides a course of the host vehicle M upon reaching the second position P2.

Figure 6:
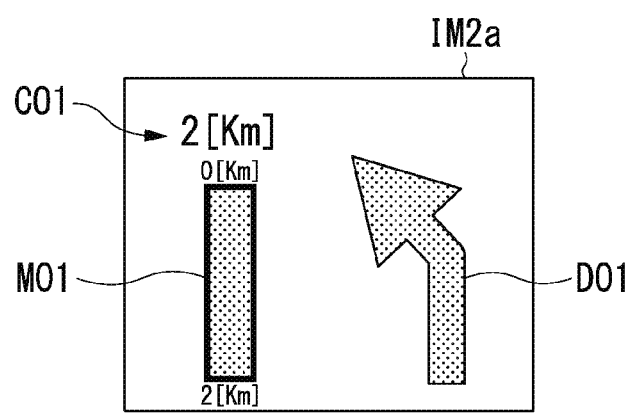
FIG. 6 is a diagram illustrating an example of a turn-by-turn image generated by a HMI controller in a second scene.
Figure 7:
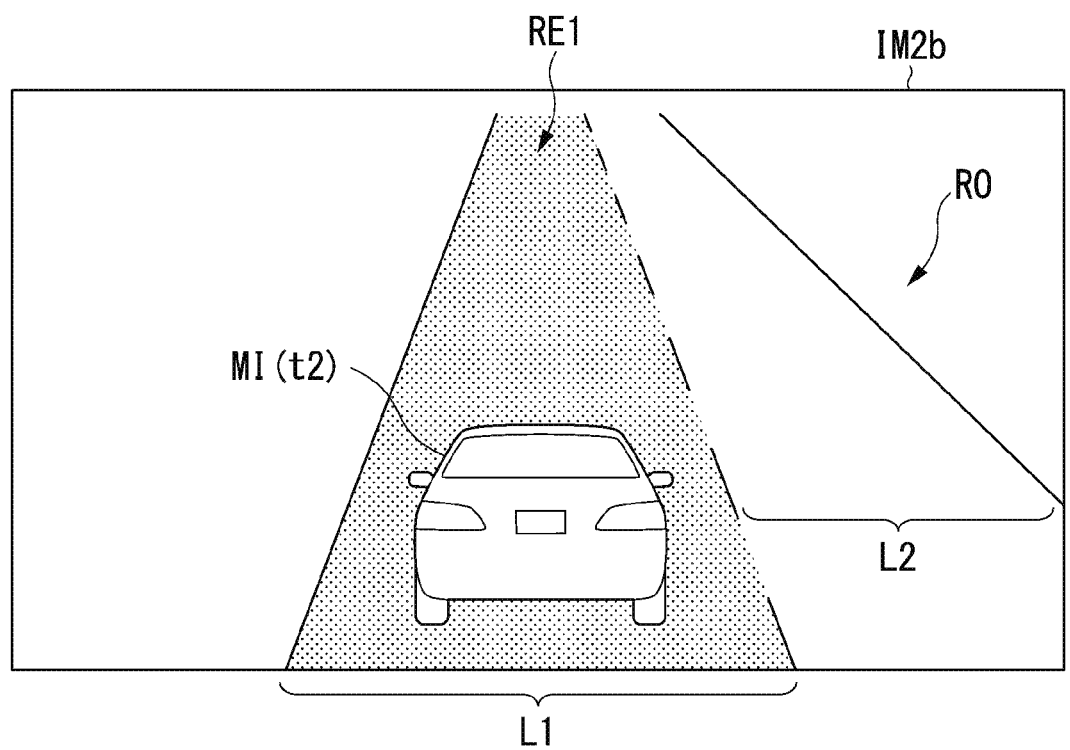
FIG. 7 is a diagram illustrating an example of a host vehicle surrounding image generated by a HMI controller in a second scene.

FIG. 6 is a diagram illustrating an example of a turn-by-turn image IM2*a* generated by the HMI controller 174 in the second scene. FIG. 7 is a diagram illustrating an example of a host vehicle surrounding image IM2*b* generated by the HMI controller 174 in the second scene. In the following description, a difference from the host vehicle surrounding image IM1 will be described. Moreover, as for a turn-by-turn image and a host vehicle surrounding image to be described later, a difference from the other images will be described.

For example, the turn-by-turn image IM2*a* includes an object image CO1 related to character information, an object image MO1 resembling a memory indicating a remaining distance to the position P1 at which the host vehicle M has to make a turn, and an object image DO1 indicating the direction of the turn. The character information includes character information related to a remaining distance to the position P1, character information related to driving control, and the like, for example. The object images CO1, MO1, and DO1 are images illustrated in a first predetermined color. The first predetermined color may be a color determined in advance, for example, and may be a color correlated with the color of an image related to a travel mode of the host vehicle M, for example. The color correlated with the color of an image related to the travel mode of the host vehicle M is a color correlated with the color of each travel mode when driving control such as ACC or LKAS is executed in a travel mode and a color corresponding to each travel mode is set, for example. The first predetermined color may be a color similar to the color of an image correlated with a travel mode of the host vehicle displayed on another display. The first predetermined color may be a color visible to an occupant by adjustment of a design, a lightness, a luminance, a color tone of a saturation, an intensity, or the like and may be a color obtained by passing through a filter having a predetermined transmittance.

The HMI controller 174 may display the turn-by-turn image IM2*a* on the first display 32A similarly to the host vehicle surrounding image IM2*b* and may display the same on another display (for example, the second display 32B or the HUD device) different from the first display 32A.

The HMI controller 174 displays a generated recommended lane image RE1 so as to be superimposed on the road image RO at a timing at which the turn-by-turn image IM2*a* is displayed. The recommended lane image RE1 includes an image in which an approximately entire region of the lane corresponding to the recommended lane is painted with a second predetermined color. The second predetermined color may be a color determined in advance and may be a color correlated with the color of an image related to a travel mode of the host vehicle M, for example. The second predetermined color may be a color similar to the first predetermined color. The second predetermined color may be a color visible to an occupant by adjustment of a design, a lightness, a luminance, a color tone of a saturation, an intensity, or the like and may be a color obtained by passing through a filter having a predetermined transmittance.

The HMI controller 174 displays the recommended lane image RE1 at a position correlated with the road image RO. The position correlated with the road image RO is a position correlated with a display position of a lane corresponding to a recommended lane among the lanes L1 and L2 included in the road image RO, for example. An example of the lane corresponding to the recommended lane is a lane adjacent, at the present time point or in a near future, to a turning destination lane L4, and however, there is no limitation thereto. In the host vehicle surrounding image IM2b of the example of FIG. 7, the recommended lane image RE1 is displayed so as to be superimposed on an approximately entire region of the lane L1 serving as an adjacent lane of the lane L4 in the future, included in the road image RO.

In this way, the HMI controller 174 can allow an occupant to recognize that it is necessary to make a turn in a near future more accurately and it is not necessary to make a turn at the present time point.

<Third Scene (Time Point t3)>

A third scene (time point t3) is a scene in which a predetermined period has elapsed from the time point t2 and the road image RO including a lane L3 is displayed on the first display 32A. Specifically, the third scene indicates a scene in which the host vehicle M travels on a position at which the remaining distance to the position P1 is 1.5 [km].

Figure 8:
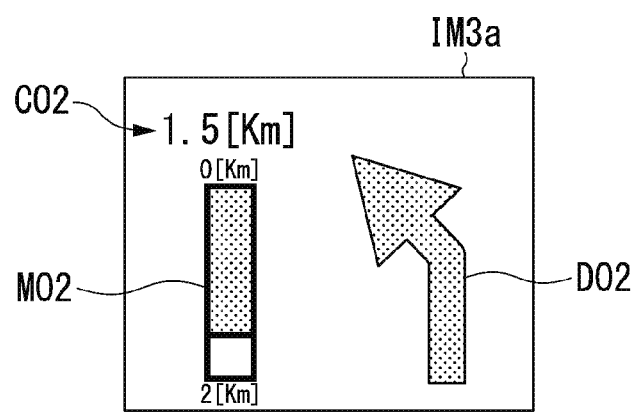
FIG. 8 is a diagram illustrating an example of a turn-by-turn image generated by a HMI controller in a third scene.
Figure 9:
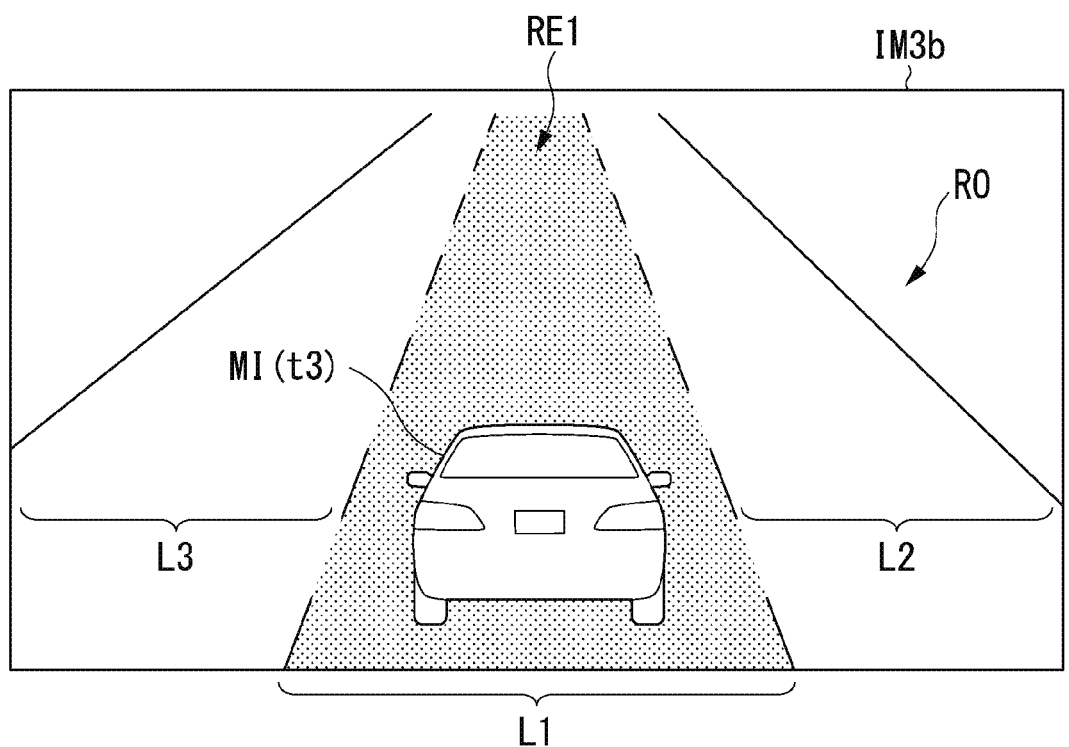
FIG. 9 is a diagram illustrating an example of a host vehicle surrounding image generated by a HMI controller in a third scene.

FIG. 8 is a diagram illustrating an example of a turn-by-turn image IM3a generated by the HMI controller 174 in the third scene. FIG. 9 is a diagram illustrating an example of a host vehicle surrounding image IM3b generated by the HMI controller 174 in the third scene. In the third scene, as illustrated in the turn-by-turn image IM3a in FIG. 8, the HMI controller 174 generates an object image $CO_2$ indicating that the remaining distance to the position P1 is 1.5 [km], an object image MO2 in which the remaining amount of a memory is adjusted so as to correspond to the remaining distance, and an object image DO2 indicating the direction of a turn. The object image DO2 is an image similar to the object image DO1. Therefore, the HMI controller 174 may not generate a new image for the object image which has not been changed and may use the object image DO1 generated previously as it is.

In the third scene, the HMI controller 174 generates a road image RO including the lane L3 that branches from the lane L1. The HMI controller 174 generates a recommended lane image RE1 and displays the generated recommended lane image RE1 on the lane L1 as illustrated in the host vehicle surrounding image IM3b in FIG. 9. In this way, an occupant can continue traveling in the lane L1 with the aid of the turn-by-turn image IM3a without making a turn to the lane L3 by mistake.

<Fourth Scene (Time Point t4)>

A fourth scene (time point t4) indicates a scene in which a predetermined period has elapsed from the time point t3 and a remaining distance to the position P1 is 800 [m].

Figure 10:
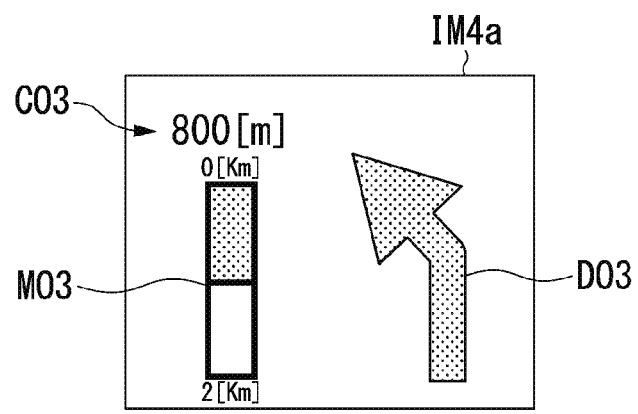
FIG. 10 is a diagram illustrating an example of a turn-by-turn image generated by a HMI controller in a fourth scene.
Figure 11:
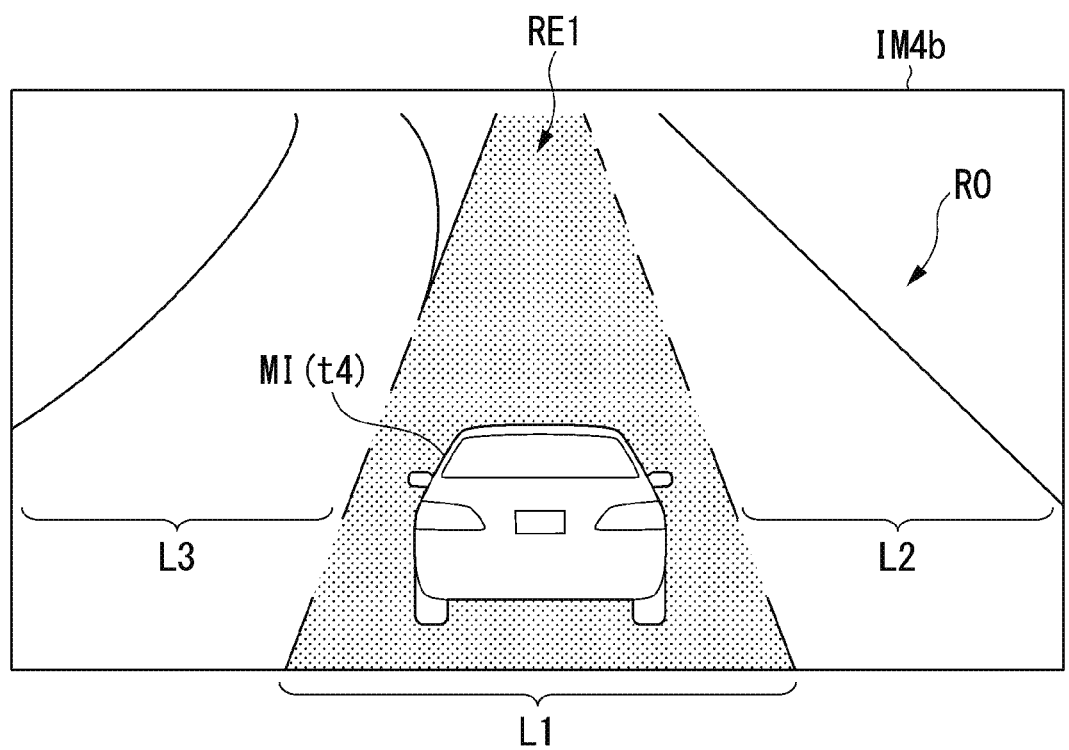
FIG. 11 is a diagram illustrating an example of a host vehicle surrounding image generated by a HMI controller in a fourth scene.

FIG. 10 is a diagram illustrating an example of a turn-by-turn image IM4a generated by the HMI controller 174 in the fourth scene. FIG. 11 is a diagram illustrating an example of a host vehicle surrounding image IM4b generated by the HMI controller 174 in the fourth scene. In the fourth scene, as illustrated in the turn-by-turn image IM4a in FIG. 10, the HMI controller 174 generates an object image CO3 indicating that the remaining distance to the position P1 is 800 [m], an object image MO3 in which the remaining amount of a memory is adjusted so as to correspond to the remaining distance, and an object image DO3 indicating the direction of a turn. The object image DO3 is an image similar to the object image DO1. Therefore, the HMI controller 174 may use the object image DO1 as it is.

In the fourth scene, the HMI controller 174 generates a road image RO having a shape in which the lane L3 branches from the lane L1 so as to comply with a road shape of the lane L3. In such a scene, as illustrated in the host vehicle surrounding image IM4b in FIG. 11, since the recommended lane image RE1 is displayed on the lane L1, an occupant can continue driving along the lane L1 without being impatient.

<Fifth Scene (Time Point t5)>

A fifth scene (time point t5) is a scene in which a predetermined period has elapsed from the time point t4 and the host vehicle M has reached the third position P3 closer to the first position P1 than the second position P2. The position P3 is a position located a distance D2 from the position P1 before the host vehicle M. The distance D2 is 30 [m], for example.

Figure 12:
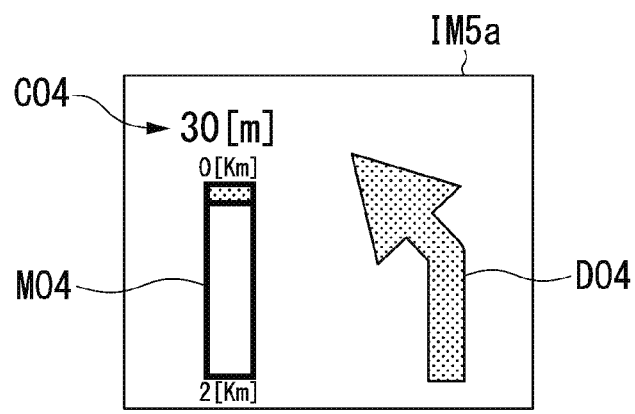
FIG. 12 is a diagram illustrating an example of a turn-by-turn image generated by a HMI controller in a fifth scene.
Figure 13:
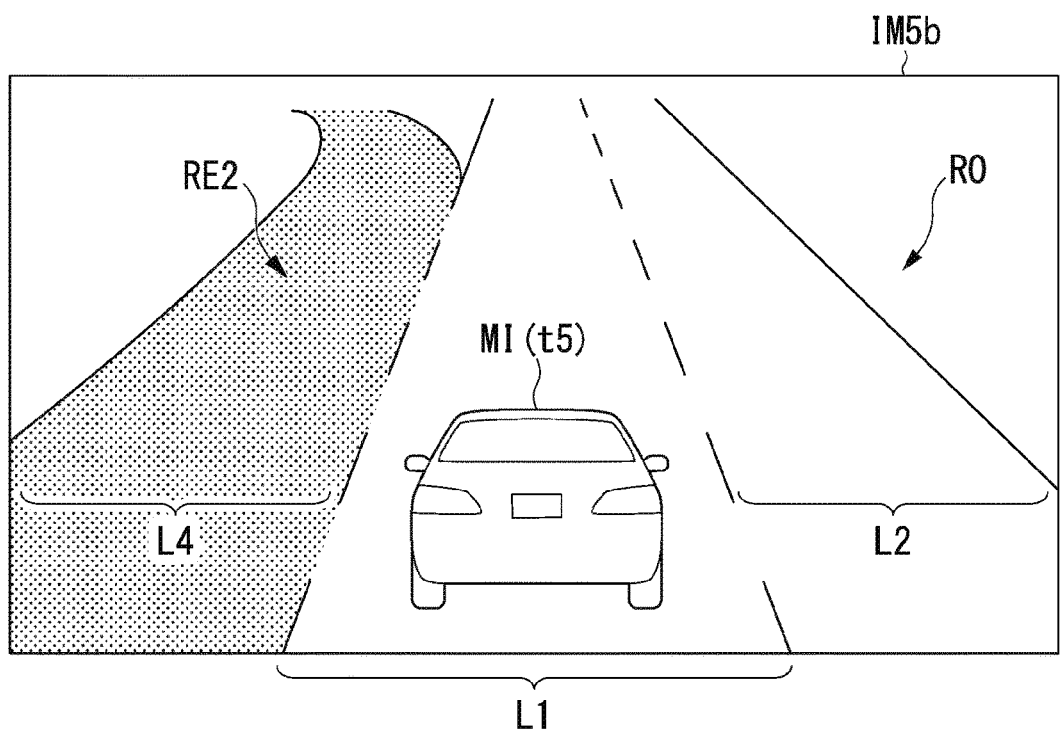
FIG. 13 is a diagram illustrating an example of a host vehicle surrounding image generated by a HMI controller in a fifth scene.

FIG. 12 is a diagram illustrating an example of a turn-by-turn image IM5a generated by the HMI controller 174 in the fifth scene. FIG. 13 is a diagram illustrating an example of a host vehicle surrounding image IM5b generated by the HMI controller 174 in the fifth scene. In the fifth scene, as illustrated in the turn-by-turn image IM5a in FIG. 12, the HMI controller 174 generates an object image CO4 indicating the remaining distance to the position P1 is 30 [m], an object image MO4 in which the remaining amount of a memory is adjusted so as to correspond to the remaining distance, and an object image DO4 indicating the direction of a turn. Since the object image DO4 is an image similar to the object image DO1, the HMI controller 174 does not generate a new image for an object image which has not been changed and may use the object image DO1 generated previously as it is.

In the fifth scene, the HMI controller 174 generates a road image RO including the lane L4 that branches from the lane L1. The HMI controller 174 generates a recommended lane image RE2 to be displayed so as to be superimposed on the turning destination lane L4 in order to allow an occupant to make a turn in the fifth scene. In this way, the occupant can understand more accurately that the information displayed by the turn-by-turn image IM5a is a turn to the lane L4.

The HMI controller 174 ends displaying the turn-by-turn image and the recommended lane image at a time point at which the host vehicle M has completed making a turn to the lane L4. The time point at which the host vehicle M has completed making a turn to the lane L4 is a time point at which due to the turn from the lane L1 to the lane L4, a predetermined position (for example, the center of gravity) of the host vehicle M is present near the center in the width direction of the lane L4 or it is predicted that the entire host vehicle M is present in the lane L4.

As described above, the HMI controller 174 displays a recommended lane image in synchronization with the start or the end of displaying of a turn-by-turn image. In this way, the HMI controller 174 can allow an occupant to understand in advance with the aid of the turn-by-turn image that it is necessary to make a turn in a near future and can allow an occupant to understand a timing to make a turn (for example, change lanes) by changing the display position of the recommended lane image. Moreover, the HMI controller 174 can allow an occupant to understand more accurately whether the present lane is a lane in which the host vehicle M can proceed toward a destination. Therefore, it is possible to provide route guidance in such a manner as to be easily understood by the occupant.

<Modification>

Figure 14:
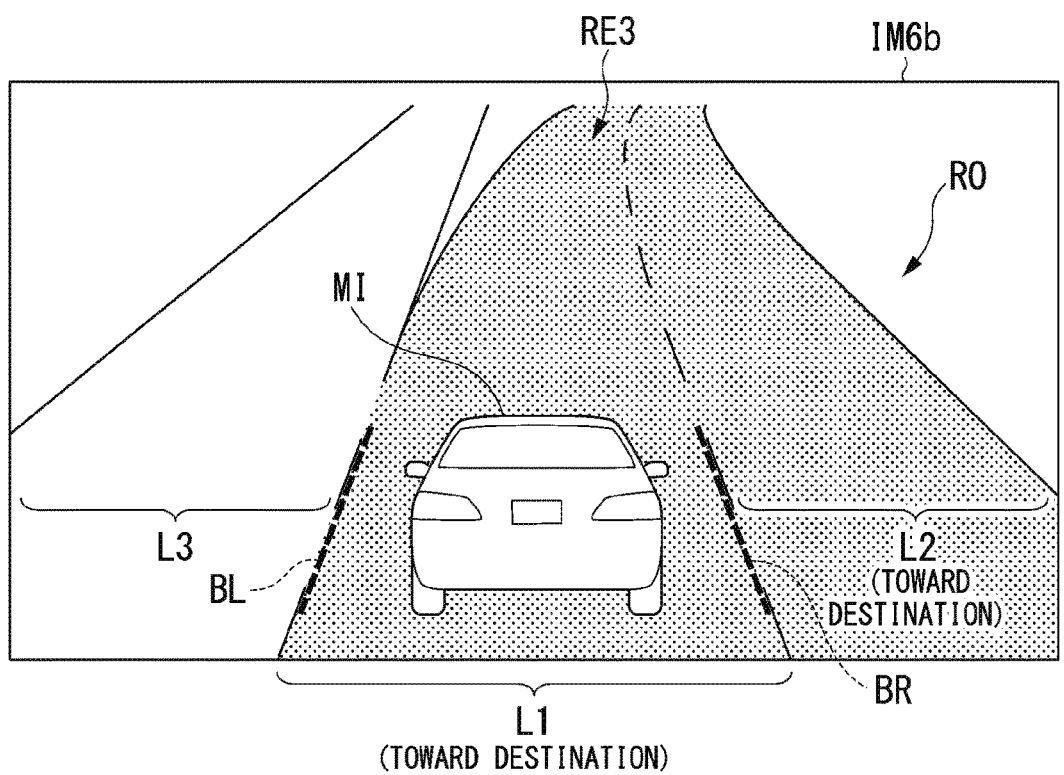
FIG. 14 is a diagram illustrating an example of a host vehicle surrounding image generated by a HMI controller.

A modification of an image display mode by the HMI controller 174 will be described. For example, when there are a plurality of lanes in which the host vehicle M can proceed toward a destination, the HMI controller 174 may display a recommended lane image so as to be superimposed on the plurality of lanes after making a turn. FIG. 14 is a diagram illustrating an example of a host vehicle surrounding image IM6b generated by the HMI controller 174. In the example of FIG. 14, it is assumed that the lanes L1 and L2 branching from the lane L3 among the lanes L1 to L3 are lanes in which the host vehicle M can proceed toward a destination.

The HMI controller 174 generates a recommended lane image RE3 that is superimposed on the lanes L1 and L2 in the road image RO and displays the generated recommended lane image RE3 so as to be superimposed on an image resembling the lanes L1 and L3 included in the road image RO. In this way, the HMI controller 174 can allow an occupant to easily understand that the occupant can proceed toward a destination by traveling on any one of the lanes L1 and L2.

The HMI controller 174 may generate an image indicating a travel mode of the host vehicle M and may display the generated image so as to be superimposed on the road image RO. In the example of FIG. 14, images BL and BR indicating that the vehicle system (the recognizer 130 or the like) recognizes the left and right lane marks partitioning the lane L1 are displayed so as to be superimposed on the host vehicle surrounding image IM6b along the left and right lane marks near the host vehicle M of the lane L1 as an example of an image indicating that LKAS-based driving control is being executed.

The HMI controller 174 may generate an image correlated with a travel mode related to a travel mode (for example, ACC or LCA) or the like other than LKAS and may display the generated image so as to be superimposed on the road image RO. For example, when ACC is executed, the HMI controller 174 generates an other vehicle image m corresponding to a preceding vehicle, an image resembling a target trajectory in trailing travel, and a radar tracking image or the like indicating that the trailing target preceding vehicle is recognized by the system and displays the generated images so as to be superimposed on a road image. In this way, the HMI controller 174 can allow an occupant to understand a travel mode (a driving control state) of the host vehicle M in more detail.

[Process Flow]

Figure 15:
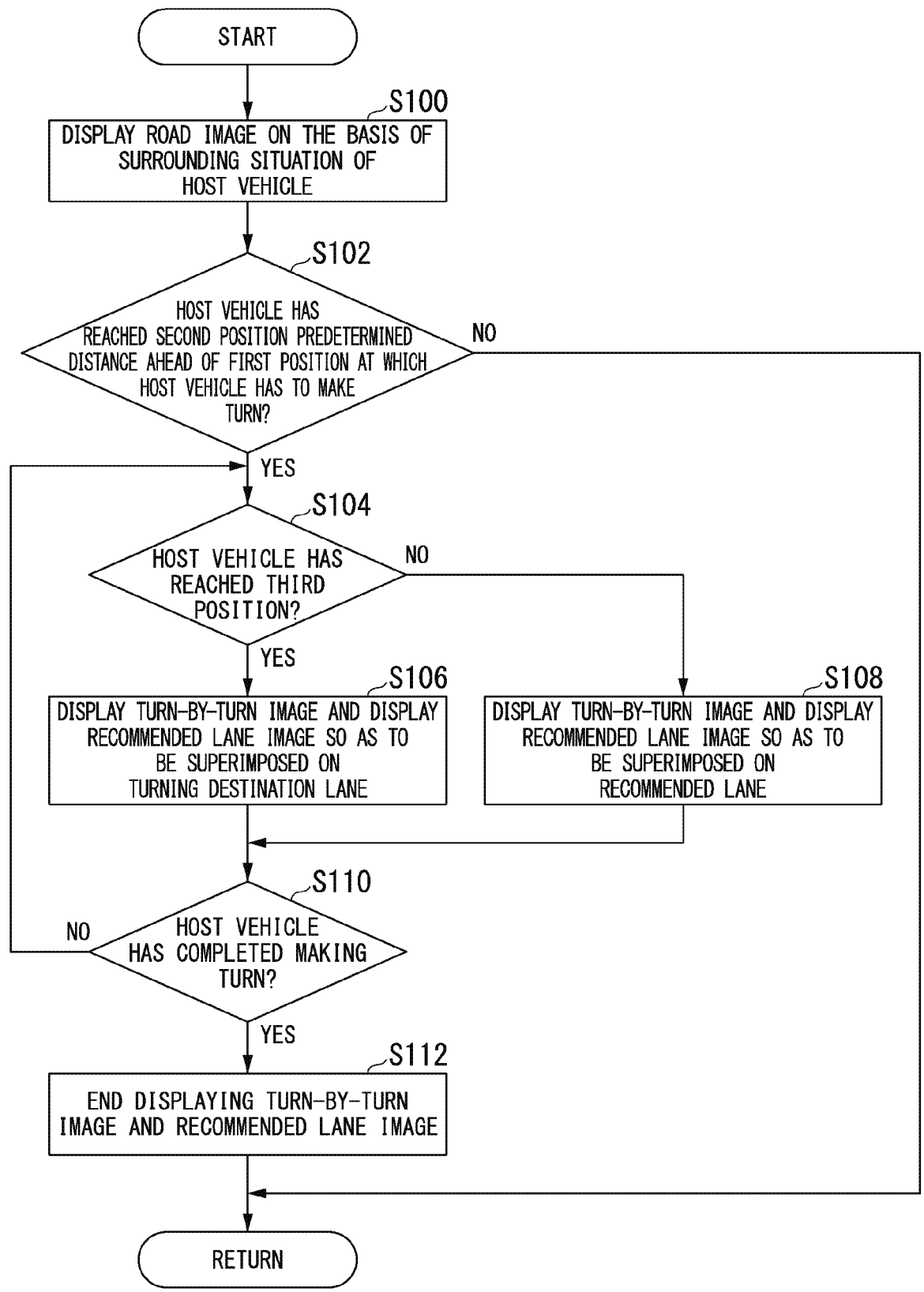
FIG. 15 is a flowchart illustrating an example of the flow of a series of processes performed by a display system.

Hereinafter, the flow of a series of processes performed by a display system according to the embodiment will be described. FIG. 15 is a flowchart illustrating an example of the flow of a series of processes performed by the display system. The processes of this flowchart may be executed repeatedly at predetermined periods during traveling of the host vehicle M to a destination set by the navigation apparatus 50, for example.

First, the HMI controller 174 generates a road image around the host vehicle M on the basis of a surrounding state of the host vehicle M recognized by the recognizer 130 and the like and displays the generated image on the display 32 (step S100). Subsequently, the HMI controller 174 determines whether the host vehicle M has reached the second position P2 located a predetermined distance before the first position P1 at which the host vehicle M has to make a turn on the basis of the information acquired by the second acquirer 172 (step S102).

When it is determined that the host vehicle M has reached the second position P2, the HMI controller 174 determines whether the host vehicle M has reached the third position P3 located closer to the first position P1 than the second position P2 on the basis of the information acquired by the second acquirer 172 (step S104). When it is determined that the host vehicle M has reached the third position P3, the HMI controller 174 generates a turn-by-turn image and a recommended lane image corresponding to a turning destination, displays the generated turn-by-turn image, and displays the recommended lane image so as to be superimposed on a turning destination lane included in the road image (step S106). When it is determined in the process of step S104 that the host vehicle M has not reached the third position P3, the HMI controller 174 generates a turn-by-turn image and a recommended lane image corresponding to a turning destination, displays the generated turn-by-turn image, and displays the recommended lane image so as to be superimposed on the recommended lane (step S108).

Subsequently, the HMI controller 174 determines whether the host vehicle M has completed making a turn (step S110). When it is determined that the host vehicle M has not completed making a turn, the flow returns to the process of step S104. When it is determined that the host vehicle M has completed making a turn, the HMI controller 174 ends displaying the turn-by-turn image and the recommended lane image (step S112). In this way, the process of this flowchart end. When it is determined in the process of step S102 that the host vehicle M has not reached the second position P2, the process of this flowchart ends.

According to the above-described embodiment, it is possible to provide route guidance in such a manner as to be more easily understood by an occupant. More specifically, according to the embodiment, it is possible to display a turn-by-turn image to an occupant, indicating that it is necessary to make a turn in a near future in order to proceed toward a destination and to allow the occupant to understand more accurately that the host vehicle is near a branching point at which the vehicle has to make a turn and it is a timing to make a turn by changing a display position of the recommended lane image superimposed on the road image. In this way, the display system can perform display control which provides more comfort to an occupant.

[Hardware Configuration]

Figure 16:
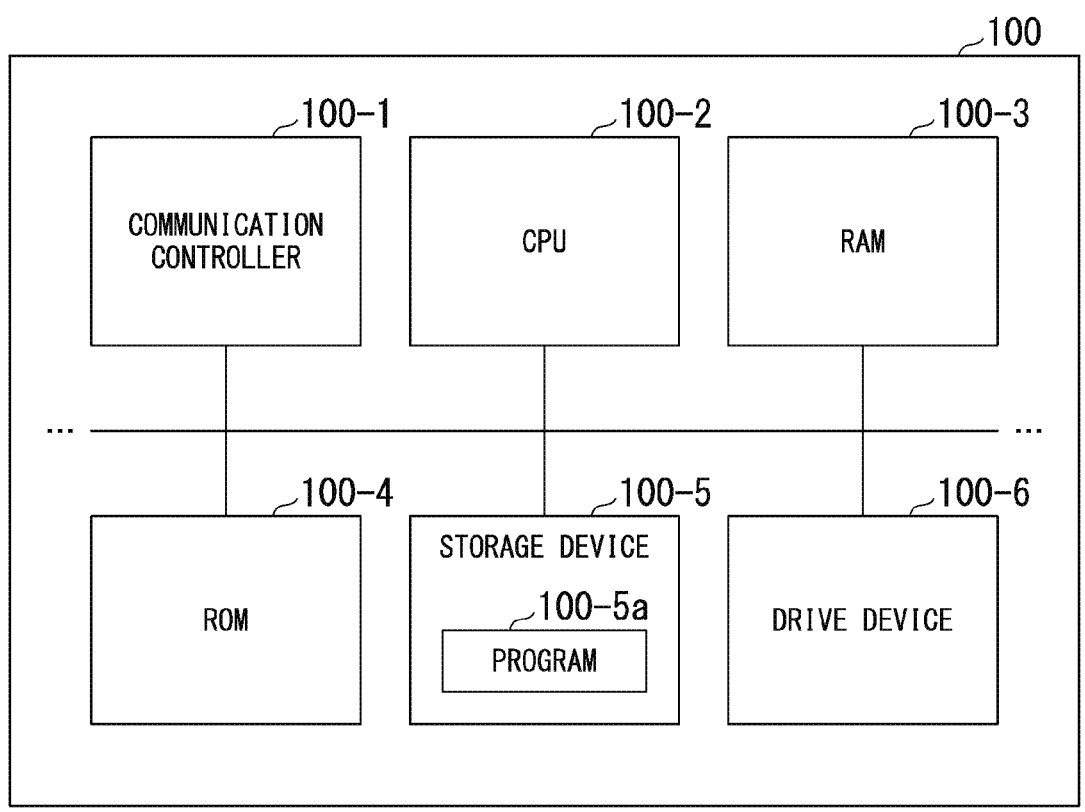
FIG. 16 is a diagram illustrating an example of a hardware configuration of a driving controller of a vehicle system including the display system of the embodiment.

FIG. 16 is a diagram illustrating an example of a hardware configuration of the driving controller 100 of the vehicle system 1 including the display system of the embodiment. As illustrated in the drawing, the driving controller 100 includes a communication controller 100-1, a CPU 100-2, a RAM 100-3 used as a work memory, a ROM 100-4 storing a boot program or the like, a storage device 100-5 such as a flash memory or a HDD, a drive device 100-6, and the like which are connected by an internal bus or a dedicated communication line. The communication controller 100-1 communicates with the components other than the driving controller 100. A program 100-5a to be executed by the CPU 100-2 is stored in the storage device 100-5. This program is deployed onto the RAM 100-3 by a direct memory access (DMA) controller (not illustrated) or the like and is executed by the CPU 100-2. In this way, some or all of the first controller 120, the second controller 160, and the third controller 170 are realized.

The above-described embodiment can be expressed as follows.

A display system including:
a display that displays an image;
a storage that stores a program; and
a processor, wherein
the processor executes the program to:
display a first image resembling roads around a vehicle and a second image resembling a recommended lane determined on the basis of a route to a destination set by the vehicle among the roads around the vehicle on the display; and
display the second image and a third image guiding a course of the vehicle on the display when the vehicle has reached a second position located a predetermined distance before a first position at which the vehicle has to make a turn in the route to the destination.

While modes for carrying out the present invention have been described using embodiments, the present invention is not limited to these embodiments, but various modifications and replacements can be made without departing from the spirit of the present invention.

What is claimed is:

1. A display system comprising:
a plurality of displays including a first display and a second display; and
a display controller that causes the first display to display a first image resembling a host vehicle, resembling one or more roads around the host vehicle, and resembling another vehicle around the host vehicle, wherein positions of the host vehicle, the one or more roads, and the another vehicle in the first image correspond to physical locations of the host vehicle and the another vehicle on the one or more roads;
wherein the display controller causes the first display to display, in the first image, the host vehicle and the another vehicle in sizes not exceeding a depicted lane width of the one or more roads;
wherein the display controller causes the first display to display a second image resembling a recommended lane determined on the basis of a route to a destination set by the host vehicle among the one or more roads, wherein the second image is overlaid on the one or more roads depicted in the first image;
wherein the host vehicle is controlled according to one of a plurality of different travel modes;
wherein, when the host vehicle has reached a second position that is located a predetermined distance before a first position at which the host vehicle has to make a turn in the route to the destination, the display controller causes the first display to display the second image and causes the second display to display a third image guiding a course of the host vehicle;
wherein the display controller causes the first display to display an image indicating a travel mode of present of the host vehicle in a color corresponding to each driving control and causes the first display to display the second image in a color correlated with a color of the image indicating the travel mode of present;
wherein the travel mode of present is a manual driving mode or a trailing travel event mode in which the host vehicle follows the another vehicle traveling in front of the host vehicle; and
wherein the color of the second image displayed on the first display and a color of the third image displayed on the second display are the same color.

2. The display system according to claim 1,
wherein the display controller causes the first display to display the second image in synchronization with the start and end of displaying the third image.

3. The display system according to claim 1,
wherein the display controller causes the first display to display the second image so as to be superimposed on a lane after making a turn when the host vehicle has reached a third position located closer to the first position than to the second position.

4. The display system according to claim 3,
wherein, when there are a plurality of lanes after making a turn, the display controller causes the first display to display the second image so as to be superimposed on the plurality of lanes after making a turn.

5. A display method for causing a computer mounted in a vehicle including a plurality of displays having a first display and a second display to execute:
displaying, on the first display, a first image resembling a host vehicle, resembling one or more roads around the host vehicle, and resembling another vehicle around the host vehicle, wherein positions of the host vehicle, the one or more roads, and the another vehicle in the first image correspond to physical locations of the host vehicle and the another vehicle on the one or more roads;
displaying, on the first display and in the first image, the host vehicle and the another vehicle in sizes not exceeding a depicted lane width of the one or more roads;
displaying, on the first display, a second image resembling a recommended lane determined on the basis of a route to a destination set by the host vehicle among the one or more roads, wherein the second image is overlaid on the one or more roads depicted in the first image;
when the host vehicle has reached a second position that is located a predetermined distance before a first position at which the host vehicle has to make a turn in the route to the destination, displaying the second image on the first display and a third image guiding a course of the host vehicle on the second display; and
causing the first display to display an image indicating a travel mode of present of the host vehicle in a color corresponding to each driving control and causing the first display to display the second image in a color correlated with a color of the image indicating the travel mode of present;
wherein the host vehicle is controlled according to one of a plurality of different travel modes;
wherein the travel mode of present is a manual driving mode or a trailing travel event mode in which the host vehicle follows the another vehicle traveling in front of the host vehicle; and
wherein the color of the second image displayed on the first display and a color of the third image displayed on the second display are the same color.

6. A computer-readable non-transitory storage medium storing a program for causing a computer mounted in a vehicle including a plurality of displays having a first display and a second display to execute:
displaying, on the first display, a first image resembling a host vehicle, resembling one or more roads around the host vehicle, and resembling another vehicle around the host vehicle, wherein positions of the host vehicle, the one or more roads, and the another vehicle in the first image correspond to physical locations of the host vehicle and the another vehicle on the one or more roads;

displaying, on the first display and in the first image, the host vehicle and the another vehicle in sizes not exceeding a depicted lane width of the one or more roads;

displaying, on the first display, a second image resembling a recommended lane determined on the basis of a route to a destination set by the host vehicle among the one or more roads, wherein the second image is overlaid on the one or more roads depicted in the first image;

when the host vehicle has reached a second position that is located a predetermined distance before a first position at which the host vehicle has to make a turn in the route to the destination, displaying the second image on the first display and a third image guiding a course of the host vehicle on the second display; and causing the first display to display an image indicating a travel mode of present of the host vehicle in a color corresponding to each driving control and causing the first display to display the second image in a color correlated with a color of the image indicating the travel mode of present;

wherein the host vehicle is controlled according to one of a plurality of different travel modes;

wherein the travel mode of present is a manual driving mode or a trailing travel event mode in which the host vehicle follows the another vehicle traveling in front of the host vehicle; and wherein the color of the second image displayed on the first display and a color of the third image displayed on the second display are the same color.

* * * * *